United States Patent

Bechtold et al.

[11] Patent Number: 5,976,417
[45] Date of Patent: Nov. 2, 1999

[54] MIXTURES OF HALS COMPOUNDS

[75] Inventors: Karl Bechtold, Schliengen, Germany; Gilbert Ligner, Wintzenheim, France; Rainer Wolf, Allschwil, Switzerland

[73] Assignee: Clariant Finance (BVI) Limited, Tortola, Virgin Islands (Br.)

[21] Appl. No.: 08/414,664

[22] Filed: Mar. 30, 1995

Related U.S. Application Data

[63] Continuation of application No. 08/206,498, Mar. 4, 1994, abandoned, which is a continuation of application No. 07/923,952, Sep. 4, 1992, abandoned.

[30] Foreign Application Priority Data

Jan. 7, 1909 [GB] United Kingdom .................. 9100257

[51] Int. Cl.$^6$ .......................... C09K 15/30; C09K 15/20; C08K 5/34
[52] U.S. Cl. .......................... 252/405; 524/99; 524/100; 524/102; 514/970
[58] Field of Search .................................. 524/102, 405; 252/394, 405; 514/970

[56] References Cited

U.S. PATENT DOCUMENTS

| | | | |
|---|---|---|---|
| 3,941,744 | 3/1976 | Murayama et al. | 546/186 |
| 4,075,165 | 2/1978 | Soma et al. | 546/16 |
| 4,716,187 | 12/1987 | Avar | 524/99 |
| 4,730,017 | 3/1988 | Avar | 524/103 |
| 4,778,837 | 10/1988 | Waterman et al. | 524/102 |
| 5,733,956 | 3/1998 | Lau et al. | 524/102 |

FOREIGN PATENT DOCUMENTS 0309402  3/1989  European Pat. Off. .

OTHER PUBLICATIONS

International Search Report, International Application No. PCT/EP92/00023, dated Apr. 10, 1992.
WO 9422946 (Oct. 13, 1994) 1995: 746099 only (Chemical Abstract).
WO 9212201 (Jul. 23, 1992) 1993: 104873 only (Chemical Abstract).
Farbe Lack (Jan. 1993) vol. 99 No. 1 pp. 25–28; Chemical Abstract 1993: 519538 only.
JP 06212032 (Aug. 2, 1994) Chemical Abstract 1995: 137151 only.
JP 0631348 (Apr. 28, 1994) Chemical Abstract 1995: 331451 only.
EP 434608 (Jun. 26, 1991) Chemical Ab. 1992:84957 only.
Polymer. Mater. Sci. Eng (Jan. 1990) vol. 63 pp. 647–653 Chemical Abstract 1991: 187602 only.
Polymer Mater. Sci. Eng (Jan. 1990) vol. 63 pp. 654–659 Chemical Abstract 1991: 187586 only.
JP 60076573 (1985) As Abstracted by Chemical Abstract 104:7262.

*Primary Examiner*—Shean C. Wu
*Attorney, Agent, or Firm*—Gabriel Lopez; Susan S. Jackson

[57] ABSTRACT

A composition, suitable for stabilizing a polymeric composition against the effects of light, comprising a) an N-acylated 2,2,6,6-tetraalkylpiperidinyl group (hereinafter N-acylated HALS) containing compound; and b) an N-oxy-subst. 2,2,6,6-tetraalkylpiperidinyl group (hereinafter N-oxy-substituted HALS) containing compound.

A further aspect of the invention relates to a composition, suitable for stabilizing a polymeric composition against the effects of light, comprising a) an N-acylated 2,2,6,6-tetraalkylpiperidinyl-group-containing compound in which a spiro group is attached in the 4-position (hereinafter defined as component i); and b) an N-acylated 2,2,6,6-tetraalkylpiperidinyl-group-containing compound in which in the 4-position no spiro group is present (hereinafter defined as component ii).

These compounds are suitable as light stabilizers in acid catalyzed lacquer system.

14 Claims, No Drawings

MIXTURES OF HALS COMPOUNDS

This is a continuation of application Ser. No. 08/206,498, filed Mar. 4, 1994, now abandoned which in turn is a continuation of application Ser. No. 07/923,952, filed Sep. 4, 1992, now abandoned.

The invention relates to novel mixtures of tetraalkylpiperidine compounds (HALS compounds), suitable as light stabilisers in polymeric systems especially in acid catalysed polymeric systems.

According to the invention there is provided a composition, suitable for stabilising a polymeric composition against the effects of light, comprising a) an N-acylated 2,2,6,6-tetraalkylpiperidinyl group (hereinafter N-acylated HALS) containing compound; and b) an N-oxy-substituted 2,2,6,6-tetraalkylpiperidinyl group (hereinafter N-oxy-substituted HAL) containing compound.

The term "oxy-substituted" includes substitution with any of the significances of $R_b$ below including preferably oxyalkylation.

Surprisingly it has been found that by mixing an N-acylated HALS with an N-oxyalkylated HALS that a synergistic effect occurs in that the stability to light of lacquers containing a mixture of N-acylated HALS and N-oxyalkylated HALS is significantly improved over lacquers with either the N-acylated HALS or the N-oxyalkylated HALS alone.

Further according to the invention there is provided a mixture comprising a) 5–95% by weight of a compound containing a group of formula I (hereinafter defined as component a)

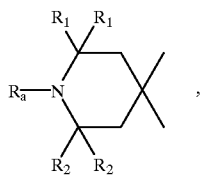

(I)

b) 5–95% by weight of a compound containing a group of formula II

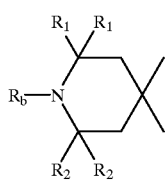

(II)

(hereinafter defined as component b))
in which $R_a$ is —CO—$R_5$, where $R_5$ is $C_{2-8}$alkenyl, preferably —C($R_3$)=$CH_2$, $C_{1-22}$alkyl, phenyl, —CO—phenyl, —NR$_7$R$_8$, —CH$_2$—C$_6$H$_5$, —CO—OC$_{1-12}$alkyl or —COOH; $R_7$ is hydrogen, $C_{1-12}$alkyl, $C_{5-6}$cycloalkyl, phenyl, phenyl-$C_{1-4}$alkyl or $C_{1-12}$alkylphenyl and $R_8$ is $C_{1-12}$alkyl or hydrogen, and Rb is oxygen; OH; —O—CO—$R_5$ preferably —O—CO-phenyl; —O—$C_{1-8}$alkyl; —O—$C_{2-8}$alkenyl; —O—$C_{3-18}$alkynyl; —O—$C_{5-12}$cyclo alkyl; —O—$C_{6-10}$bicycloalkyl; —O—$C_{5-8}$cyclo alkenyl, —O—$C_{6-10}$aryl, —O—$R_{30}$ where $R_{30}$ is $C_{7-9}$alkaryl unsubstituted or monosubstituted by $C_{1-4}$alkyl or aryl; where $R_5$ is $C_{2-8}$alkenyl, —C($R_3$)=$CH_2$ (preferably), $C_{1-22}$alkyl, phenyl, —CO-phenyl, —NR$_7$R$_8$, —CH$_2$—C$_6$H$_5$, —CO—OC$_{1-12}$alkyl or —COOH;

$R_3$ is hydrogen or $C_{1-4}$alkyl;

each $R_1$, independently, is —CH$_3$ or —CH$_2$($C_{1-4}$alkyl) or both groups $R_1$ form a group —(CH$_2$)$_5$—; and each $R_2$, independently, is —CH$_3$ or —CH$_2$($C_{1-4}$alkyl) or both groups $R_2$ from a group —(CH$_2$)$_5$—;

the percentages being based on the amount of component a) and b) in the mixture.

Preferably $R_3$ is hydrogen.

Preferably $R_5$ is $R_5'$ where $R_5'$ is —CH=CH$_2$, $C_{1-8}$alkyl, —COOC$_{1-8}$alkyl, $C_{2-8}$alkenyl or phenyl.

Preferably component a) is a compound of formula III

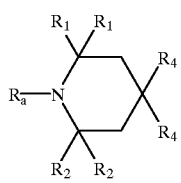

(III)

in which $R_a$ is —CO—$R_5$; and each $R_4$ independently is selected from hydrogen, a hydroxy group, an ether group, an amine and amide forming group, an ester and ester forming group and a urea and urethane forming group; or both groups $R_4$ together with the C atom to which they are attached form a spiro group; and the other symbols are as described above.

Preferably component b) is a compound of formula IV

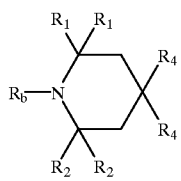

(IV)

in which $R_b$ is oxygen; OH; —O—CO—$R_5$; —O—$C_{1-8}$alkyl; —O—CO—phenyl; —O—$C_{2-8}$alkenyl; —O—$C_{3-18}$alkynyl; —O—$C_{5-12}$cyclo alkyl; —O—$C_{6-10}$bicycloalkyl; —O—$C_{5-8}$cyclo alkenyl, —O—$C_{6-10}$aryl, —O—$R_{30}$ where $R_{30}$ is $C_{7-9}$alkaryl unsubstituted or monosubstituted by $C_{1-4}$alkyl or aryl; and each $R_4$ independently is selected from hydrogen, a hydroxy and ether group, an amine and amide forming group, an ester and ester forming group and a urea and urethane forming group; or both groups $R_4$ together with the C atom to which they are attached form a spiro group; and the other symbols are as described above.

Further according to the invention there is provided a composition, suitable for stabilising a polymeric composition against the effects of light, comprising a) an N-acylated 2,2,6,6-tetraalkylpiperidinyl-group-containing compound in which a Spiro group is attached in the 4-position (hereinafter defined as component i); and b) an N-acylated 2,2,6,6-tetraalkylpiperidinyl-group-containing compound in which in the 4- position no spiro group is present (hereinafter defined as component ii).

The above composition provides significant improvements in gloss retention and reduced cracking which occurs in polymeric material containing only the individual components.

It has been surprisingly found that by mixing two N-acylated HALS compounds, components i) and ii), that a synergistic improvement in light fastness also occurs in acid catalysed systems.

Preferred compounds of component i) are of formula V

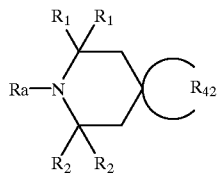

(V)

in which $R_a$ is —CO—$R_5$; and $R_{42}$ together with the C atom to which it is attached forms a spiro group; and the other symbols are as defined above.

Preferred compounds of component ii) are of formula VI

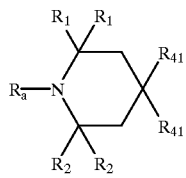

(VI)

where each $R_{41}$ independently is selected from hydrogen, an amine and amide forming group, an ester and ester forming group and a urea and urethane forming group; and $R_1$, $R_2$ and $R_a$ are as defined above.

Preferably the amount of component a) (or component i) is 20–80%, more preferably 30–70%, most preferably 40–60%. Preferably the amount of component b) (or component ii) respectively) is 20–80%, more preferably 30–70%, most preferably 40–60%.

Preferred compounds of formula III are those of formula IIIa to IIIn

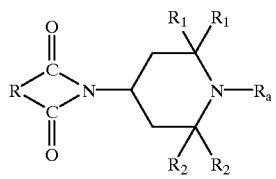

(IIIa)

in which R is a saturated or unsaturated optionally alkyl or alkenyl substituted alkylene or cycloalkylene radical having 2–20 carbon atoms; and the other symbols are as defined above;

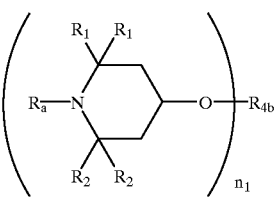

(IIIb)

where $n_1$ is a number from 1–4 inclusive, preferably 1 or 2;

$R_{4b}$ is A' when $n_1$=1, B' when $n_1$=2, C' when $n_1$=3, or D' when $n_1$=4;

A' is hydrogen; $C_{1-18}$alkyl, optionally interrupted by one or more oxygen atoms; cyanoethyl; benzyl, glycidyl; a monovalent radical of an aliphatic, cycloaliphatic, araliphatic or aromatic carboxylic acid or of a carbamic acid; or of a phosphorus-containing acid or a monovalent silyl radical, preferably a radical of an aliphatic carboxylic acid having 2–18 carbon atoms, of a cyloaliphatic carboxylic acid having 5–12 carbon atoms or of an aromatic carboxylic acid having 7–15 carbon atoms;

B' is $C_{1-12}$alkylene, $C_{4-12}$alkenylene, xylylene, a bivalent radical of an aliphatic, cycloaliphatic, arylaliphatic or aromatic dicarboxylic acid or of a dicarbamic acid or of a phosphorus-containing acid, or a bivalent silyl radical, preferably a radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms;

C' is a trivalent radical of an aliphatic, cycloaliphatic or aromatic tricarboxylic acid, of an aromatic tricarbamic acid or of a phosphorus-containing acid, or a trivalent silyl radical; and D' is a tetravalent radical of an aliphatic, cycloaliphatic or aromatic tetracarboxylic acid;

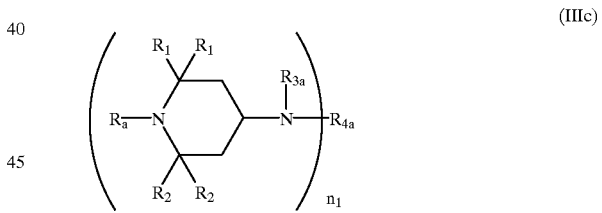

(IIIc)

where n is the number 1 or 2;

$R_a$, $R_1$ and $R_2$ are as defined above;

$R_{3a}$ is hydrogen, $C_{1-12}$alkyl, $C_{5-7}$cycloalkyl, $C_{7-8}$aralkyl, $C_{2-18}$alkanoyl, $C_{3-5}$alkenoyl, benzoyl or a group of the formula $CH_2$—CH(OH)—Z or of the formula —CONH—Z wherein Z is hydrogen, methyl or phenyl;

$R_{4a}$, when n is 1, is hydrogen, $C_{1-18}$alkyl, $C_{5-7}$cycloalkyl, $C_{2-8}$alkenyl unsubstituted or substituted by a cyano, carbonyl or carbamide group, or it is glycidyl, a group of the formula —$CH_2$—CH(OH)—Z or of the formula —CONH—Z wherein Z is hydrogen, methyl or phenyl:

$R_{4a}$, when n is 2, is $C_{2-12}$alkylene, $C_{6-12}$arylene, xylylene, a —$CH_2$—CH(OH)—$CH_2$—group or a —$CH_2$—CH(OH)—$CH_2$—O—X—O—$CH_2$—CH(OH)—$CH_2$—group wherein X is $C_{2-10}$alkylene, $C_{6-15}$arylene or C6–12 cycloalkylene; or, provided that $R_{3a}$ is not alkanoyl, alkenoyl or benzoyl, $R_{4a}$ can also be a bivalent radical of an aliphatic, cycloaliphatic or aromatic dicarboxylic acid or of a dicarbamic acid, or can be the group —CO— or $R_{3a}$ and $R_{4a}$ together, when n is 1, can be the cyclic radical of an aliphatic or aromatic 1,2- or 1,3-dicarboxylic acid;

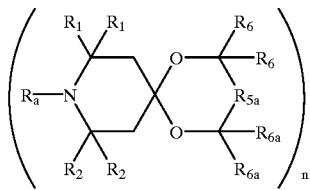
(IIId)

where n is the number 1 or 2;

$R_a$, $R_1$ and $R_2$ are as defined above;

$R_{5a}$, when n is 1, is $C_{2-8}$alkylene or hydroxyalkylene or $C_{4-22}$acyloxyalkylene;

$R_{5a}$, when n is 2, is the group $(-CH_2)_2C(CH_2-)_2$;

$R_6$ is hydrogen or both groups $R_6$ form a group =O;

$R_6$a is hydrogen or both groups $R_{6a}$ form a group =O;

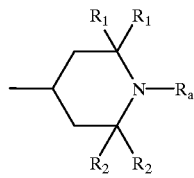
(IIIe)

where n is the number 1 or 2;

$R_a$, $R_1$ and $R_2$ are as defined above;

$R_{16}$ is hydrogen, $C_{1-12}$alkyl, allyl, benzyl, glycidyl or $C_{2-6}$alkoxyalkyl;

$R_{17}$, when n is 1, is hydrogen, $C_{1-12}$alkyl, $C_{3-5}$alkenyl, $C_{7-9}$aralkyl, $C_{5-7}$cycloalkyl, $C_{2-4}$hydroxyalkyl, $C_{2-6}$alkoxyalkyl, $C_{6-10}$aryl, glycidyl, a group of the formula $-(CH_2)_n-COO-Q$ or of the formula $-(CH_2)_m-O-CO-Q$ wherein m is 1 or 2, and Q is $C_{1-22}$alkyl, $C_{2-22}$alkenyl or phenyl; or a group of the formula $-CH_2-CH(CH_3)-COO-Q$ or of the formula $-CH_2-CH(CH_3)-O-CO-Q$ and Q is as defined above;

$R_{17}$, when n is 2, is $C_{2-12}$alkylene, $C_{6-12}$arylene, a group $-CH_2-CH(OH)-CH_2-O-X-CH_2-CH(OH)-CH_2-$ wherein X is $C_{2-10}$alkylene, $C_{6-15}$arylene or $C_{6-12}$cycloalkylene, or a group $-CH_2CH-(OZ')CH_2-(OCH_2-CH(OZ')-CH_2)_2-$wherein Z' is hydrogen, $C_{1-18}$alkyl, allyl, benzyl, $C_{2-12}$alkanoyl or benzoyl; or a divalent radical of an aliphatic, cycloaliphatic, araliphtic or aromatic dicarboxylic acid;

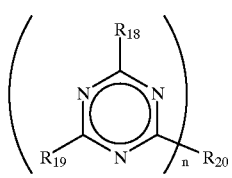
(IIIf)

where n is the number 1 or 2;

$R_{18}$ is a group of the formula

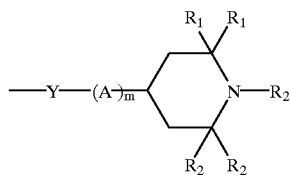

where $R_a$, $R_1$ and $R_2$ are as defined above;

Y is $-O-$; $-NR_{21}$; or $-NR_{21}-CO-CO-NR_{21}-$;

A is $C_{2-6}$alkylene;

m is the number 0 or 1;

$R_{19}$ is selected from one of the groups $-R_{18}$,

$-R_{22}$, $-OR_{23}$, $-NHCH_2OR_{23}$ and $-N(CH_2OR_{23})_2$;

$R_{20}$, when n is 1, is a group selected from $R_{18}$ and $R_{19}$;

$R_{20}$, when n is 2, is the group $-Y-Q_1-Y-$, where $Q_1$ is $C_{2-6}$alkylene optionally interrupted by $-N(R_{24})-$;

$R_{21}$ is hydrogen, $C1-12$alkyl, cyclohexyl, benzyl or $C_{1-4}$hydroxyalkyl, or a group of the formula

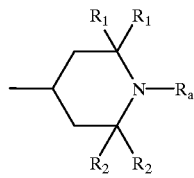

$R_{22}$ is $C_{1-12}$alkyl, cyclohexyl, benzyl or $C_{1-4}$hydroxyalkyl;

$R_{23}$ is hydrogen, $C_{1-12}$alkyl or phenyl;

$R_{24}$ is hydrogen or the group $-CH_2OR_{23}$;

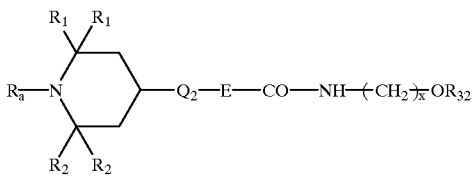
(IIIg)

x is an integer from 1 to 6 inclusive;

$R_a$, $R_1$ and $R_2$ are as defined above;

where $Q_2$ is $-N(R_{31})-$or $-O-$;

E is $C_{1-3}$alkylene, the group $-CH_2-CH(R_{34})-O-$ where $R_{34}$ is hydrogen, methyl or phenyl, the group $-(CH_2)_3-NH-$or a single bond or $-CO-$;

$R_a$ is as defined above;

$R_{32}$ is hydrogen or $C_{1-18}$alkyl;

$R_{31}$ is hydrogen, $C_{1-18}$alkyl, $C_{5-7}$cycloalkyl, $C_{7-12}$aralkyl, cyanoethyl, $C_{6-10}$aryl, the group $-CH_2-CH(R_{4a})-OH$ where $R_{4a}$ has the meaning defined above (when n=1), a group of the formula

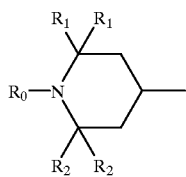

$R_o$ has the significance of $R_a$, or $R_{31}$ is a group of the formula

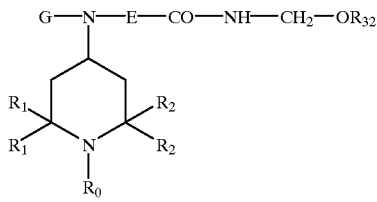

where G can be $C_{2-6}$alkylene or $C_{6-12}$arylene and E, $R_a$, $R_1$, $R_2$, $R_o$ and $R_{32}$ are as defined above;

(IIIh)

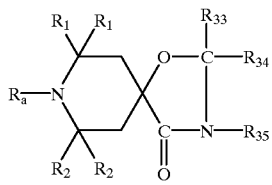

where $R_a$, $R_1$ and $R_2$ are as defined above;

$R_{33}$ and $R_{34}$ independently are hydrogen, $C_{1-30}$alkyl or benzyl or $R_{33}$ is hydrogen or $C_{1-4}$alkyl and $R_{34}$ is phenyl, ($C_{1-4}$alkyl) phenyl, chlorophenyl, 4-hydroxy-3,5-t-butylphenyl or naphthyl; or $R_{33}$ and $R_{34}$ together with the carbon atoms to which they are attached form a $C_{5-15}$cycloalkylidene ring which may be unsubstituted or substituted by one $C_{1-4}$alkyl group or form a group of formula

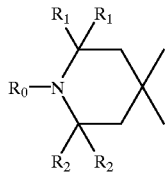

$R_{35}$ is hydrogen, $C_{1-20}$alkyl, $C_{2-20}$alkenyl or —CH($R_{36}$)—CH($R_{37}$)—COOR$_{38}$ where $R_{36}$ is hydrogen, methyl, phenyl or —COOC$_{1-21}$alkyl;

$R_o$ is as defined above;

$R_{37}$ is hydrogen or methyl and $R_{38}$ is hydrogen, a $C_{1-21}$alkyl or $C_{2-22}$alkenyl group which may be unsubstituted or monosubstituted by phenyl or naphthyl and which may be interrupted by oxygen or by a $C_{1-4}$alkylimine group;

phenyl; (C1–12alkyl) phenyl; $C_{5-12}$cycloalkyl or a saturated aliphatic hydrocarbon residue having 2–20 carbon atoms which may be interrupted by oxygen or by a $C_{1-4}$alkylimine group and which is substituted by 1 to 3 groups selected from ($C_{1-12}$alkyl)COO— and groups of the formula (IIIi)

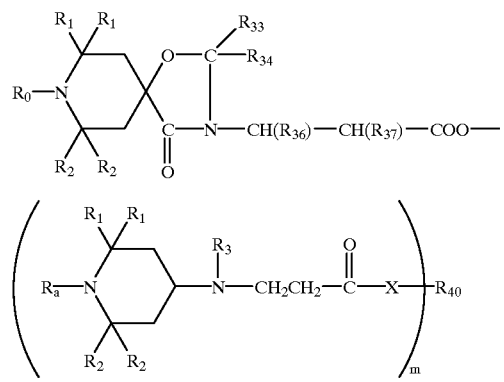

in which $R_a$, $R_1$, $R_2$ and $R_3$ are as defined above;

X is —O—, —NH— or —N($C_{1-4}$alkyl)—and $R_{40}$ is a saturated or unsaturated aliphatic group unsubstituted or substituted by one or two groups selected from —OH and $C_{1-4}$alkoxy and which can be interrupted by an oxygen or sulphur atom; or an aromatic group, unsubstituted or substituted by one or two groups selected from —OH, $C_{1-4}$alkyl and $C_{1-4}$alkoxy;

m is an integer of from 1 to 4 inclusive;

(IIIj)

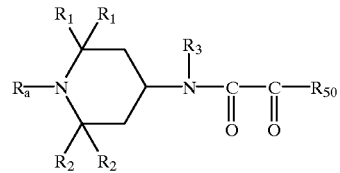

where $R_a$, $R_1$, $R_2$ and $R_3$ are as defined above and $R_{50}$ is an amide or ester forming group.

Preferably $R_{50}$ is an amide forming group of the formula —N($R_3$)—$R_{51}$ where $R_{51}$ is an aliphatic, cycloaliphatic, aromatic or heterocyclic (non-aromatic or aromatic) group, all of which may bear substituents (preferably 1 to 3) selected from $C_{1-4}$alkoxy, $C_{1-12}$alkyl, $C_{1-12}$alkyl -mercapto, $C_{1-12}$alkylamino, phenoxy, phenyl mercapto, phenylamino, acryloyloxy, methacryloyloxy and 2,2,6,6-tetraalkylpiperidine groups or by oxalamido or acyloxy groups which may be further substituted by 2,2,6,6-tetraalkylpiperidine group;

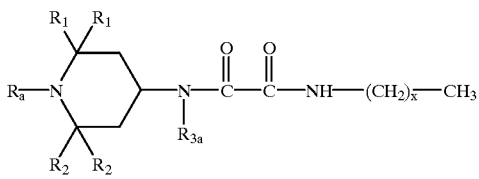
(IIIk)

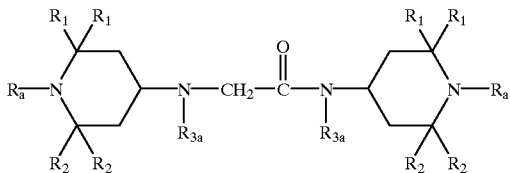
(IIIl)

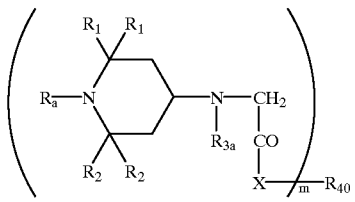
(IIIm)

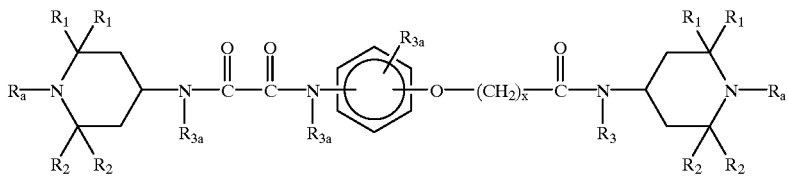
(IIIn)

where the symbols are as defined above.

Compounds containing groups of formula II are described in EP 309,402, the contents of which is incorporated herein by reference.

Compounds of formula III and IV are known or may be made from known compounds by known methods.

(Compounds of formula IIIa and IVa in which R is R' or R" are described in detail in U.S. Pat. No. 4,356,307 and U.S. Pat. No. 4,778,837, the contents of which are incorporated herein by reference.)

(Compounds of formula IIIi are described in U.S. Pat. No. 4,408,051 wherein R in the compounds of the said U.S. Patent is $R_a$ of this application the contents of which is incorporated herein by reference).

(Compounds of formula IIIj are described in U.S. Pat. No. 4,716,187, wherein R in the compound of the patent is $R_a$ of this application the content of which is incorporated herein by reference)

(Compounds of formula IIIk are describe in U.S. Pat. No. 4,730,017, wherein R of the compounds of this Patent is $R_a$ of the present application, the contents of which are incorporated herein by reference).

Preferred compound of formula IV are those of formula IVa to IVo

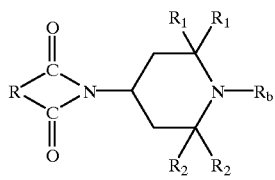
(IVa)

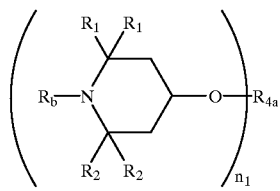
(IVb)

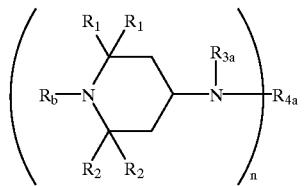
(IVc)
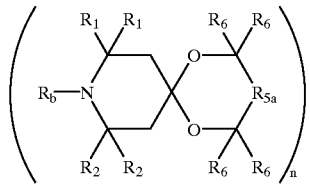
(IVd)
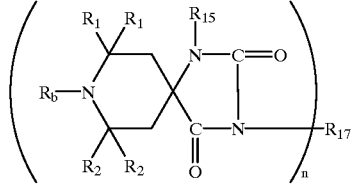
(IVe)
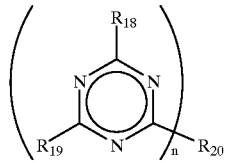
(IVf)
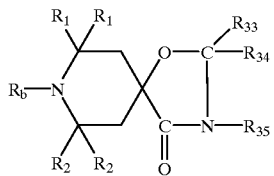
(IVg)
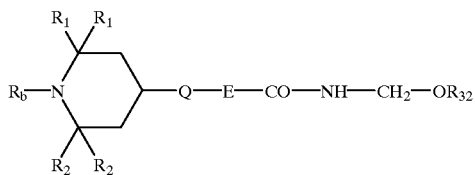
(IVh)
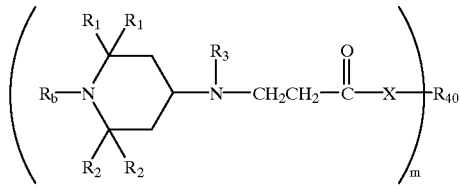
(IVi)
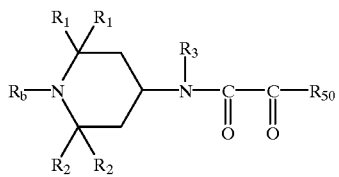
(IVj)

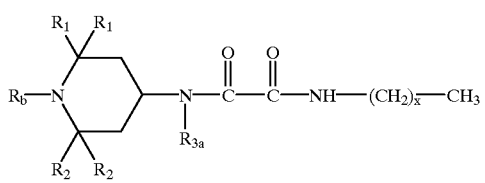
(IVk)
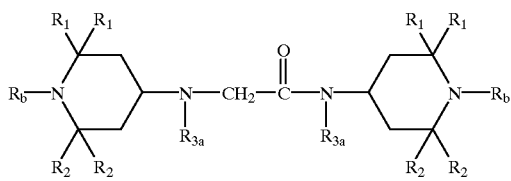
(IVl)
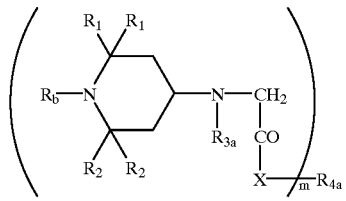
(IVm)
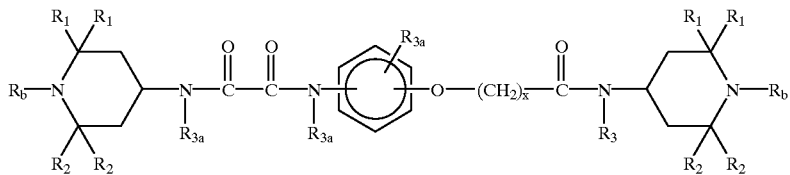
(IVn)
wherein the symbols are as defined above.
Most preferred compounds of formula III are those of formulae III',—III", and III'"
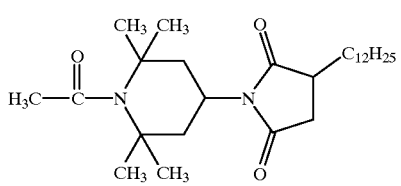
(III')
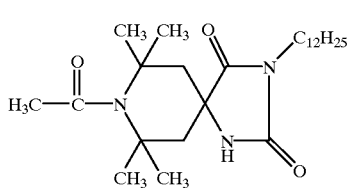
(III")
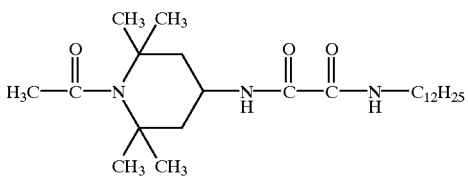
(III'")
The most preferred compound of formula IV is that of formula IV'

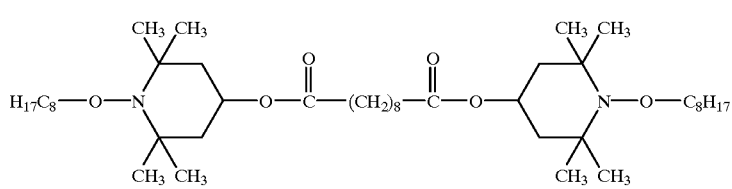

(IV')

Preferred compounds of formula V are of formulae IIId, IIIe, and IIIh.

Most preferred compounds of formula V are of formula III".

Preferred compounds of formula VI are compounds of formula IIIa to IIIc, IIIf, IIIg, and IIIj to IIIh defined above.

Most preferred compounds of formula VI are of formulae III' and III'" defined above.

Preferably R is R' where R' is —CH($R_{10}$)—CH$_2$— or

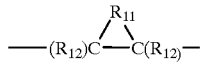

—C($R_{12}$)— where $R_{10}$ is selected from $C_{12-18}$ alkyl or $C_{12-18}$ alkenyl; cyclo $C_{5-6}$alkylene, 1,2-cyclohexanediyl and a bicyclic divalent radical;

$R_{11}$ is an alicyclic or bicyclic ring system and each $R_{12}$ independently is $C_{1-4}$alkyl or hydrogen.

More preferably R is R" where R" is —CH($R_{10}$')—CH$_2$— where $R_{10}$' is $C_{12-18}$alkyl.

Preferably $R_a$ is $R_a$' where $R_a$' is —COR$_5$' where $R_5$' is —CH=CH$_2$, $C_{1-8}$alkyl, —CO—O—$C_{1-8}$alkyl, $C_{2-8}$alkyenyl or phenyl.

Preferably $R_5$' is $R_{5''}$ where $R_{5''}$ is —CH=CH$_2$, $C_{1-4}$ alkyl or —CO—O—$C_{1-4}$ alkyl.

Preferably $R_b$ is $R_b$' where $R_b$' is —O—CO—$R_5$' where $R_5$' is defined above.

Preferably each $R_1$ and each $R_2$ is —CH$_3$.

In this Specification any $C_{1-8}$ alkyl or $C_{1-6}$ alkyl group is preferably a $C_{1-4}$ alkyl group and any $C_{1-4}$ alkyl group is preferably methyl or ethyl; preferably any alkoxy group is methoxy or ethoxy.

In this Specification, any group capable of being linear or branched is linear or branched.

Where a symbol appears more than once in a formula, its significances are independent of one another unless indicated to the contrary.

Further, according to the invention there is provided a polymeric composition comprising a polymeric material and a mixture of component a) and of component b) or a mixture of component i) and component ii).

Further according to the invention there is provided a method for stabilising a lacquer composition based on acrylic, alkyd and/or polyester resins (which if desired, can be crosslinked with melamine/formaldehyde resins, epoxide resins or polyisocyanates) which comprises incorporating into the resin a mixture of component a) and component b) or a mixture of component i) and component ii), optionally together with an acid catalyst or compound capable of releasing an acid catalyst.

Further, according to the invention there is provided a lacquer composition based on acrylic, alkyd and/or polyester resins (which if desired, can be crosslinked with melamine/formaldehyde resins, epoxide resins or polyisocyanates) containing a mixture of component a) and component b) or a mixture of component i) and component ii) optionally together with an acid catalyst or compound capable of releasing an acid catalyst.

The concentration of a mixture of component a) and component b) or a mixture of component i) and component ii) employed in the polymeric material is suitably 0.01 to 8% by weight, preferably 0.02% to 1% by weight and gives a clear improvement in the light- and weather-stability of organic pigments in stoving finishes as well as reducing the tendency to hairline cracking and loss of gloss as the result of weathering. This is also found for metallic finishes and excellent long-term stability of the clear top coat of two layer metallic finishes is obtained. In such finishes, the mixture of component a) and component b) or amixture of component i) and component ii) may be added to the metallic undercoat, the clear top coat or both, preferably only to the clear top coat. The metal surface to be finished may be under-coated with primer coatings as is customary in the art of coating metal surfaces.

The mixture of component a) and component b) or a mixture of component i) and component ii) may be added before, during or after the polymerization step, and may be added in solid form; in solution, preferably as a liquid concentrate containing from 20 to 80% by weight of a mixture of component a) and component b) or a mixture of component i) and component ii) and 80–20% solvent; or as a solid masterbatch composition containing 10 to 80% by weight of a mixture of component a) and component b) or a mixture of component i) and component ii) and 90 to 20% by weight of a solid polymeric material which is identical with or compatible with the polymeric material to be stabilized.

Suitable polymeric materials include plastic materials for example polyethylene, polypropylene, ethylene/propylene copolymers, polyvinyl chloride, polyester, polyamide, polyurethane, polyacrylonitrile, ABS, terpolymers of acrylates, styrene and acrylonitrile, styrene/acrylonitrileand styrene/butadiene. Other plastics materials such as polybutylene, polystyrene, chlorinated polyethylene, polycarbonate, polymethylmethacrylate, polyphenylene oxide, polypropylene oxide; polyacetals, phenol/formaldehyde resins and epoxy resins may also be used. Preferred plastic materials are polypropylene, polyethylene, ethylene/propylene copolymers and ABS.

Natural polymers for example natural rubber may also be stabilized, as may lubricating oils containing polymeric material.

The mixture of a compound containing a group of formula I defined above and of a compound containing a group of formula II defined above may be incorporated by known methods into the polymeric material to be stabilized. Of particular importance is blending of the compounds with thermoplastic polymers in the melt, for example in a melt blender or during the formation of shaped articles, including foils, films, tubes, containers, bottles, fibres and foams by extrusion, injection moulding, blow moulding, spinning or wire coating.

It is not essential for the polymeric material to be fully polymerised before mixing with the compounds according to the invention. The compounds may be mixed with monomer, prepolymer or precondensate, and the polymerisation or condensation reaction is carried out subsequently. This will of course be the preferred method of incorporation of the compounds into thermosetting polymers, which cannot be melt blended.

Further antioxidants can be added to polymeric material either before, at the same time as or after (but before polymerisation occurs) the addition of a compound according to the invention.

Examples of antioxidants include benzofuran-2-ones, indolin-2-ones and sterically hindered phenols, sulphur and phosphorus containing compounds and mixtures thereof.

Preferred sterically hindered phenols include β-(4-hydroxy-3,5-ditert.butylphenyl)-propionyl stearate, methane tetrakis-(methylene-3(3',5'-ditert.butyl-4-hydroxyphenyl)-propionate), 1,3,3-tris-(2-methyl-4-hydroxy-5-tert.butyl phenyl)butane, 1,3,5-tris(4-tert.butyl-3-hydroxy-2, 6-di-methylbenzyl)-1,3,5-triazinyl-2,4,6(1H,3H,5H)-trione, bis-(4-tert.butyl-3-hydroxy-2,6-di-methylbenzyl)dithiol terephthalate, tris(3,5-ditert.butyl-4-hydroxybenzyl) isocyanurate, the triester of beta-(4-hydroxy-3,5-ditert.butylphenyl)propionic acid with 1,3,4-tris-(2-hydroxyethyl)-5-triazinyl-2,4,6(1H,3H,5H)-trione, bis (3,3-bis-(4'-hydroxy-3-tert.butylphenyl)-butyric acid)glycol ester, 1,3,5-trimethyl-2,4,6-tris-(3,5-ditert.butyl-4-hydroxybenzyl) benzene, 2,2'-methylene-bis-(4-methyl-6-tert.butylphenyl) terephthalate, 4,4-methylene-bis-(2,6-ditert.-butylphenol), 4,4'-butylidine-bis-(tert.butylmetacresol), 2,2'-methylene-bis-(4-methyl-6-tert.-butyl)-phenol, 1,3,5-tris-(3,5-di-t-butyl-4-hydroxyphenyl)-isocyanurate and 1,1,3,tris-(5-tert.butyl-4-hydroxy-2-methylphenyl)-butane.

Preferred sulphur containing antioxidative co-stabilizers which may be used include di-tridecyl-3,3-thiodipropionate, distearyl-3,3-thiodipropionate, di-lauryl-3,3-thiodipropionate, methane tetrakis(methylene-3-hexylthiopropionate), methane tetrakis (methylene-3-dodecylthiopropionate) and dioctadecyl disulphide.

Preferred phosphorus-containing co-stabilizers which may be used include trinonylphenyl phosphite, 4,9-distearyl-3,5,8,10-tetraoxadiphosphaspiroundecane, tris-(2, 4-ditert.butylphenyl) phosphite, trilauryl phosphite, bis(2,6-di-t.butyl-4-methylphenyl)pentaerythrityl-diphosphite, bis (2,4-di-t.butylphenyl) pentaerythrityl-diphosphite, distearyl-pentaerythrityl diphosphite and tetrakis(2,4-ditert.butyl phenyl)-4,4'-biphenylene diphosphonite.

Further additives that can be added to polymeric compositions according to the invention include aminoaryl compounds, U.V. stabilisers and antistatic agents, flame-proofing agents, softeners, nucleating agents, metal deactivators, biocides, impact modifiers, fillers, pigments and fungicides.

Preferred aminoaryl compounds include N,N'-dinaphthyl-p-phenylene diamine and N,N'-hexamethylene-bis-3-(3,5-ditert.butyl-4-hydroxy phenyl)-propionamide.

Preferred U.V. stabilisers include U.V. absorbers (e.g. 2-(2'-hydroxyphenyl)-benztriazoles, 2-hydroxybenzophenones, 1,3-bis-(2'-hydroxy-benzoyl-) benzene salicylates, cinnamates and oxalic acid diamides; U.V. quenchers such as benzoates and substituted benzoates; and hindered amine light stabilisers (for example N-unsubstituted, N-alkyl or N-acyl substituted 2,2,6,6-tetra-alkyl piperidine compounds) other than those of the invention.

Preferably a compound of formula XX

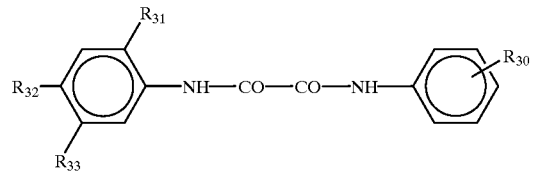

in which $R_{30}$ is $C_{6-22}$ alkyl or $C_{6-22}$alkoxy;

$R_{31}$ and $R_{32}$ independently, are selected from hydrogen, $C_{1-8}$ alkyl, $C_{1-12}$ alkoxy, $C_{1-12}$ alkylthio, phenoxy and phenylthio provided that only one of $R_{31}$ and $R_{32}$ is alkylthio, phenoxy or phenylthio; and $R_{33}$ is hydrogen or $C_{1-8}$ alkyl; is added to a compound of formula I.

The mixture of component a) and component b) or mixture of component i) and component ii) are especially suitable for use in organic polymer-containing coatings, particularly automotive finishes.

Automotives finishes are generally solutions or dispersion of organic polymers or polymer precursors in organic solvents. The majority are stoving finishes, which require the application of heat, generally above 80° C., on order to harden the finish in an acceptable time once it has been applied to the primer-coated metal surface. The hardening step may be accelerated by the use of an acid catalyst. The effect of this heating may be to accelerate the chemical reaction between polymer precursors in a thermosetting system, or to bring about fusion of particles of a thermoplastic polymer.

Many automotive finishes are metallic finishes, which contain flakes of metal, usually aluminium, in order to provide optical effects due to reflection. Such finishes are often two-coat finishes, in which a clear top coat finish is applied over a base coat finish containing a single pigment and/or metal flakes. The compounds of formula I can be in the top coat finish or the ground coat finish, preferably the former. Such two-coat metallic finishes have particular need to U.V.-stabilizers in the top coat, since the polymer in this coat is not protected by light-absorbing pigments, and it is subjected to almost double the normal amount of radiation because of reflection of light from the lower metallic layer.

The mixture of component a) and component b) or mixture of component i) and component ii) are suitable for use as U.V.-stabilizers in a wide range of liquid finishes, for example those based on combinations of melamine-formaldehyde resins with oil-modified polyester resins, polyacrylate resins with added crosslinkers, or saturated polyesters; or on self-crosslinked polyacrylate or polyacrylate resin co-polymerised with styrene.

Further examples are two-component finishes based on an aliphatic or aromatic di-isocyanate and a hydroxy-group-containing polyacrylate, polyester or polyether resin. These polyurethane 2-component finishes are preferably hardened at 60 to 120° C. Thermoplastic polyacrylate resins may also be used, the latter being particularly useful in metallic finishes, as are also polyacrylate resins with added crosslinkers in combination with melamine-formaldehyde resins etherified with butanol and, further, hydroxy-group-containing polyacrylate resins are described in U.S. Pat. No. 3,062,753, the contents of which are incorporated herein by reference.

The mixture of component a) and component b) or mixture of component i) and component ii) are particularly useful in acid catalysed stoving finishes particularly in the top coat of two metallic finishes.

The mixture of component a) and component b) or mixture of component i) and component ii) may be added to the finish at any stage in its manufacture, and may be added in solid form or in solution, preferably in the form of a liquid concentrate in a suitable solvent or in the form of a dispersion in water or organic solvent.

In practice the mixture of component a) and component b) or mixture of component i) and component ii) are added to a finish as a solution in organic solvent (as a liquid finish) in which the binder material is between 35% (low solid finishes) and 70% by weight (high solid finishes). The binder material of the finish can be in aqueous emulsion or suspension form (as an aqueous finish) in which the binder material part makes up 20to 30% by weight. However, the mixture of component a) and component b) or of component i) and of component ii) can be added to known powder finishes.

The mixture of component a) and component b) or mixture of component i) and component ii) are to be added to the liquid or powder finishes before stoving or hardening. Preferably the mixture of component a) and component b) or mixture of component i) and component ii) are used in liquid finishes since it is easy to add exact dosages. It is particularly preferred to use a concentrate (preferably in a hydrocarbon solvent) containing at least 40%, preferably, 60 to 80% by weight of the total weight of the concentrate of the mixture of component a) and component b) or mixture of component i) and component ii) to finishes for stoving.

The compounds of the invention can also be used in photopolymeric substrates containing photoinitiators for the photopolymerisation.

The invention will now be illustrated by the following Examples in which all parts and percentages are by weight and all temperatures are in ° C. The amount of light stabilizer is based on the solids weight in the lacquers

EXAMPLE 1

A 2 layer metallic coating comprising a base coat and a clear top coat can be prepared from the follow lacquers.

Base coat lacquer

| | |
|---|---|
| 18.75% | of clear cloat lacquer 1 defined below (50% solids) |
| 51.75% | of a cellulose - acetobutyrate solution (20%) commercially available as Cellit BP 500 |
| 13.54% | of n-butyl acetate |
| 6.45% | of xylene |
| 5.15% | of ethylene glycol acetate |
| 0.26% | of anti-sedimenting medium: Aerosil 200 |
| 3.85% | of a 65% aluminium parte in ethylene glycol acetate commercially available as Alcoci 7530 |
| 0.25% | of Phthalocyanine Blue (C.I. Pigment Blue 15:1) |
| 100.00% | (the ratio of the pigment ot aluminium being about 1:10) |

Clear coat lacquer 1 is formulated as follows:

80.00% of an acrylic resin, commercially available as Viacryl SC344—a 50% in a solution of xylene and n-butanol (4:1 ratio)

13.90% of melamine resin 4.10% of n-butanol and 2.00% of a diluent commercially available as Byketol OK.

Procedure of preparing the two coat lacquer coating:

A 10×30 cm primed aluminium piece is coated wet on wet with the base coat lacquer, to which 1% of a 50:50 mix of the compound of formula 1a and 1b

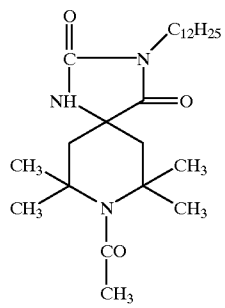

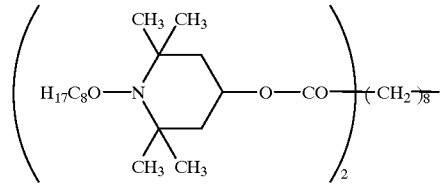

has been applied to give a 15μ base coating and a 35μ clear coating.

The so treated aluminum piece is then stoved at 140° C. for 35 minutes.

EXAMPLE 2

A two layer metallic coating comprising a base coat and a clear top the following lacquers.

a) Base coat lacquer:

| | |
|---|---|
| 18.75% | of the clear lacquer 1 defined below (50% solids); |
| 51.75% | of a cellulose-acetobutyrate solution (20%) commercially available as CELLIT BP 500; |
| 13.54% | of n-butyl acetate; |
| 6.45% | of xylene; |
| 5.15% | of ethylene glycol acetate; |
| 0.26% | of an anti-sedimenting agent medium: AEROSIL 200; |
| 3.85% | of a 65% aluminium paste in ethylene glycol acetate commercially available as ALCOCI 7530; and |
| 0.25% | of Phthalocyanaine Blue (CI Pigment Blue 15:1). |
| 100.00% | the ratio of the pigment to aluminium being about 1:10. | b) Clear coat lacquer 1 is formulated as below:

57.50% of PARALOID AT 400 70% (Acrylic binder from Rohm and Haas);

18.20% of CYMEL 1130 (Melamine binder from Dyno Lyamann);

1.50% of BXK 306 (10% solution in Exxaffe 600 BYK Chemicals);

21.60% Exxate 600 (Solvent from Eno Chemicals);

1.20% CYCAT 4045 (Blocked acid catalyst from Dyno Cyanamid).

A 10×30 cm primed aluminium piece is coated wet on wet with the base coat lacquer and then the clear coat lacquer to which 2% of a 50:50% mixture of compounds of formula 1a and 1b has been applied to give a 15μ base coating and a 35μ clear coating. The so-treated aluminum piece is then stoved at 140° C. for 35 minutes.

EXAMPLES 3 and 4

Examples 1 and 2 are repeated using, instead of the compound of formula 1a, 2% of a 50:50 mix of the compound of formula 1b defined in Example 1 and the compound of formula 3a (Example 3)

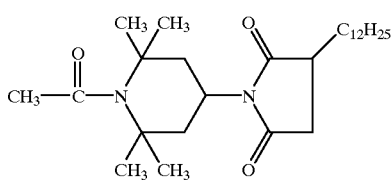
(3a)

or 2% of a 50:50 mix of the compound of formula 1b defined in Example 1 and the compound of formula 4a (Example 4)

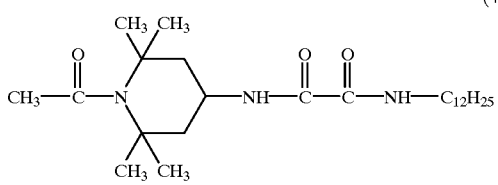
(4a)

EXAMPLE 5

Examples 1 to 3 are repeated using additionally 1% of a U.V. absorber of the formula 5a

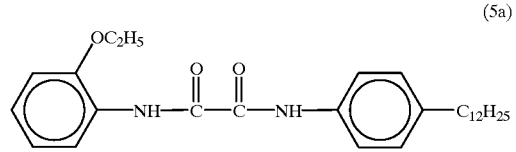
(5a)

with the mixture of compounds of formula 1a and 1b, defined in Example 1.

EXAMPLE 6

Examples 1 to 4 can be repeated in which 2.2% (actives) of the monobutylester of maleic anhydride are added to the clear lacquer; and instead of stoving at 140° C. for 35 minutes the lacquer is acid cured at 90° C. for 30 minutes.

EXAMPLE 7

Examples 1 and 2 are repeated using instead of the mixture of compounds of 1a and 1b, 1% of a 50.50 mixture of compounds 1a and 3a (without any of the compound of formula 1b present).

EXAMPLES 8 and 9

Examples 1 and 2 are repeated using instead of the mixture of compounds of formula 1a and 1b, 1% of a 50:50 mixture of the compound of formula 1a and the compound of formula 3a; (Example 6) and 1% of a 50:50 mixture of the compound of formula 1a and the compound of formula 4a

EXAMPLE 10

A two layer coating in which the top coat is 2C-PUR can be prepared as follows:

A base coat lacquer is formulated as in Example 1.

A clear lacquer is prepared as follows:

The first component of the 2C-PUR comprises 44.1% of a hydroxy-group-containing acrylic resin (OH number about 150) commercially available as Macrynal SM 510 N, a 60% solution in xylene and ethylene glycol acetate (ratio 4:1)

35.2% of a diluent mixture of methylethyl ketone and xylene (1:1)

3.0% of Byketol spezial: commercially available (silicone containing) levelling agent.

The second component comprises 17.7% of an aliphatic polyisocyanate commercially available as Desmodin N (which is a 75% solution in xylene/ethylene glycol acetate 4:1).

The second component is then added to the first component and (defined above) mixed wet. To the 2C PUR so formed, 1% of a 50:50 mixture of a compound of formula 1a and 1b (defined in Example 1) is applied.

The base and clear lacquers (at the same thicknesses as in Example 1) are applied to an aluminium piece wet on wet as described in Example 1. The lacquers are then stoved at 80° C. for 35 minutes.

Example 10 can be repeated using 1% of any one of the compounds of formula 1a or 1b with compounds 3a or 4a (defined above).

What is claimed is:

1. A mixture comprising a) 5–95% by weight of a compound containing a group of formula III

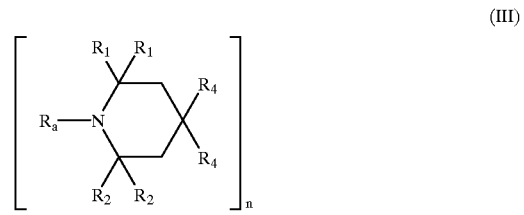
(III)

and b) 5–95% by weight of a compound containing a group of formula IV

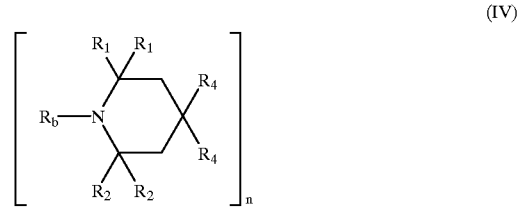
(IV)

in which $R_a$ is —CO—$R_5$, $R_5$ is $C_{2-8}$alkenyl, $C_{1-22}$alkyl, phenyl, —CO-phenyl, —NR$_7$R$_8$, —CH$_2$—C$_6$H$_5$,—CO—OC$_{1-12}$alkyl, or —COOH;

$R_7$ is hydrogen, $C_{1-12}$alkyl, $C_{5-6}$cycloalkyl, phenyl, phenyl-$C_{1-4}$alkyl, or $C_{1-12}$alkylphenyl;

$R_8$ is $C_{1-12}$alkyl or hydrogen;

$R_b$ is oxygen, OH, —O—CO—$R_5$, —O—$C_{1-8}$alkyl, —O—CO-phenyl, —O—$C_{2-8}$alkenyl, —O—$C_{3-18}$alkynyl, —O—$C_{5-12}$cycloalkyl, —O—$C_{6-10}$bicycloalkyl, —O—$C_{5-8}$cycloalkenyl, —O—$C_{6-10}$aryl, or —O—$R_{30}$;

$R_{30}$ is $C_{7-9}$alkaryl unsubstituted or monosubstituted by $C_{1-4}$alkyl or aryl;

each $R_1$, independently, is —$CH_3$ or —$CH_2(C_{1-4}$alkyl), or both groups $R_1$ form a group —$(CH_2)_5$—;

each $R_2$, independently, is —$CH_3$ or —$CH_2(C_{1-4}$alkyl), or both groups $R_2$ from a group —$(CH_2)_5$—;

n is a number greater than or equal to 1; and each $R_4$, independently, is hydrogen, hydroxy, an ether, an amide forming group, an ester, an ester forming group, a urea, or a urethane forming group; or both groups $R_4$ together with the C atom to which they are attached form a spiro group;

the percentages being based on the amount of component a) and b) in the mixture.

2. A mixture suitable for stabilizing a polymeric composition against the effects of light comprising i) a compound of formula V

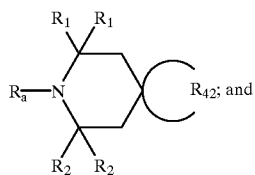

ii) a compound of formula VI

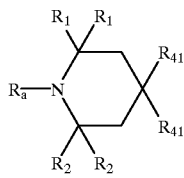

wherein each $R_1$, independently, is —$CH_3$ or —$CH_2(C_{1-4}$alkyl), or both groups $R_1$ form a group —$(CH_2)_5$—;

each $R_2$, independently, is —$CH_3$ or —$CH_2(C_{1-4}$alkyl), or both groups $R_2$ from a group —$(CH_2)_5$—;

$R_a$ is —CO—$R_5$, $R_5$ is $C_{2-8}$alkenyl, $C_{1-22}$alkyl, phenyl, —CO-phenyl, —$NR_7R_8$, —$CH_2$—$C_6H_5$, —CO—$OC_{1-12}$alkyl, or —COOH;

$R_7$ is hydrogen, $C_{1-12}$alkyl, $C_{5-6}$cycloalkyl, phenyl, phenyl-$C_{1-4}$-alkyl, or $C_{1-12}$alkylphenyl;

$R_8$ is $C_{1-12}$alkyl or hydrogen;

each $R_{41}$, independently, is hydrogen, an amide forming group, an ester, an ester forming group, a urea, or a urethane forming group; and $R_{42}$ together with the C atom to which it is attached forms a spiro group.

3. A mixture comprising a) 10–90% by weight of a compound containing a group of formula III

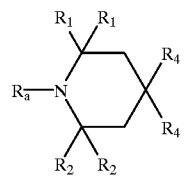

and b) 10–90% by weight of a compound containing a group of formula IV

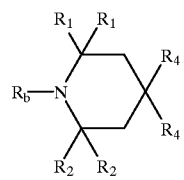

wherein $R_a$ is —CO—$R_5$;

$R_5$ is $C_{2-8}$alkenyl, $C_{1-22}$alkyl, phenyl, —CO-phenyl, —$NR_7R_8$, —$CH_2$—$C_6H_5$, —CO—$OC_{1-12}$alkyl, or —COOH;

$R_7$ is hydrogen, $C_{1-12}$alkyl, $C_{5-6}$cycloalkyl, phenyl, phenyl-$C_{1-4}$-alkyl, or $C_{1-12}$alkylphenyl;

$R_8$ is $C_{1-12}$alkyl or hydrogen;

$R_b$ is oxygen, OH, —O—CO—$R_5$, —O—$C_{1-8}$alkyl, —O—CO-phenyl, —O—$C_{2-8}$alkenyl, —O—$C_{3-18}$alkynyl, —O—$C_{5-12}$cycloalkyl, —O—$C_{6-10}$bicycloalkyl, —O—$C_{5-8}$cycloalkenyl, —O—$C_{6-10}$aryl, or —O—$R_0$;

$R_{30}$ is $C_{7-9}$alkaryl unsubstituted or monosubstituted by $C_{1-4}$alkyl or aryl;

each $R_1$, independently, is —$CH_3$ or —$CH_2(C_{1-4}$alkyl), or both groups $R_1$ form a group —$(CH_2)_5$—;

each $R_2$, independently, is —$CH_3$ or —$CH_2(C_{1-4}$alkyl), or both groups $R_2$ from a group —$(CH_2)_5$—;

each $R_4$, independently, is hydrogen, hydroxy, an ether, an amide forming group, an ester, an ester forming group, a urea, or a urethane forming group; or both groups $R_4$ together with the C atom to which they are attached form a spiro group.

4. A mixture of claim 1 in which the compound of formula III is selected from the group consisting the formulae IIIa through IIIn

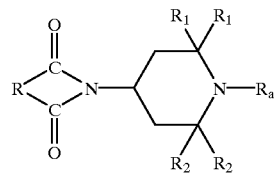

in which R is a saturated or unsaturated, optionally alkyl- or alkenyl-substituted, alkylene or cycloalkylene radical having 2–20 carbon atoms;

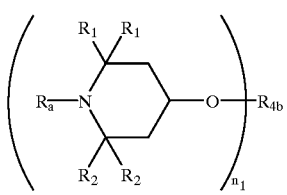 (IIIb)

where $n_1$ is a number from 1–4 inclusive;

$R_{4b}$ is $A^1$ when $n_1=1$, $B^1$ when $n_1=2$, $C^1$ when $n_1=3$, or $D^1$ when $n_1=4$;

$A^1$ is hydrogen; $C_{1-18}$ alkyl, optionally interrupted by one or more oxygen atoms; cyanoethyl; benzyl, glycidyl; a monovalent radical of an aliphatic, cycloaliphatic, araliphatic or aromatic carboxylic acid or of a carbamic acid; or of a phosphorus-containing acid or a monovalent silyl radical;

$B^1$ is $C_{1-12}$ alkylene, $C_{4-12}$ alkenylene, xylylene, a bivalent radical of an aliphatic, cycloaliphatic, arylaliphatic or aromatic dicarboxylic acid or of a dicarbamic acid or of a phosphorus-containing acid, or a bivalent silyl radical;

$C^1$ is a trivalent radical of an aliphatic, cycloaliphatic or aromatic tricarboxylic acid, of an aromatic tricarbamic acid or of a phosphorus-containing acid, or a trivalent silyl radical; and $D^1$ is a tetravalent radical of an aliphatic, cycloaliphatic or aromatic tetracarboxylic acid;

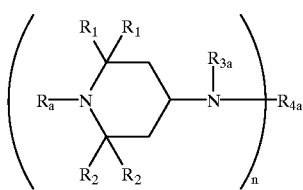 (IIIc)

where n is the number 1 or 2;

$R_{3a}$ is hydrogen, $C_{1-12}$ alkyl, $C_{5-7}$ cycloalkyl, $C_{7-8}$ aralkyl, $C_{2-18}$ alkanoyl, $C_{3-5}$ alkenoyl, benzoyl or a group of the formula $CH_2$—$CH(OH)$—Z or of the formula —CONH—Z wherein Z is hydrogen, methyl or phenyl;

$R_{4a}$, when n is 1, is hydrogen, $C_{1-18}$ alkyl, $C_{5-7}$ cycloalkyl, $C_{2-8}$ alkenyl unsubstituted or substituted by a cyano, carbonyl or carbamide group, glycidyl, or a group of the formula —$CH_2$—$CH(OH)$—Z or —CONH—Z wherein Z is hydrogen, methyl, or phenyl;

$R_{4a}$, when n is 2, is $C_{2-12}$ alkylene, $C_{6-12}$ arylene, xylylene, a —$CH_2$—$CH(OH)$—$CH_2$— group or a —$CH_2$—$CH(OH)$—$CH_2$—O—X—O—$CH_2$—CH(OH)—$CH_2$— group wherein X is $C_{2-10}$ alkylene, $C_{6-15}$ arylene or $C_{6-12}$ cycloalkylene; or, provided that $R_{3a}$ is not alkanoyl, alkenoyl or benzoyl, $R_{4a}$ is a bivalent radical of an aliphatic, cycloaliphatic or aromatic dicarboxylic acid or of a dicarbamic acid, or is the group —CO—;

$R_{3a}$ and $R_{4a}$ together, when n is 1, is the cyclic radical of an aliphatic or aromatic 1,2- or 1,3-dicarboxylic acid;

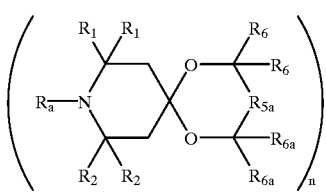 (IIId)

where n is the number 1 or 2;

$R_{5a}$, when n is 1, is $C_{2-8}$ alkylene or hydroxyalkylene or $C_{4-22}$ acyloxyalkylene;

$R_{5a}$, when n is 2, is the group (—$CH_2$)$_2$C($CH_2$—)$_2$;

$R_6$ is hydrogen or both groups $R_6$ form a group =O;

$R_{6a}$ is hydrogen or both groups $R_{6a}$ form a group =O;

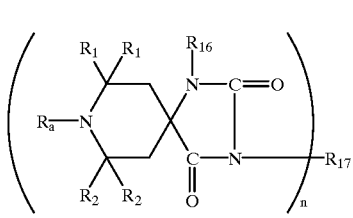 (IIIe)

where n is the number 1 or 2;

$R_{16}$ is hydrogen, $C_{1-12}$ alkyl, allyl, benzyl, glycidyl, or $C_{2-6}$ alkoxyalkyl;

$R_{17}$, when n is 1, is hydrogen; $C_{1-12}$ alkyl; $C_{3-5}$ alkenyl; $C_{7-9}$ aralkyl; $C_{5-7}$ cycloalkyl; $C_{2-4}$ hydroxyalkyl; $C_{2-6}$ alkoxyalkyl; $C_{6-10}$ aryl; glycidyl; a group of the formula —$(CH_2)_n$—COO—Q or —$(CH_2)_m$—O—CO—Q wherein m is 1 or 2, and Q is $C_{1-22}$ alkyl, $C_{2-22}$ alkenyl or phenyl; or a group of the formula —$CH_2$—CH ($CH_3$)—COO—Q, or —$CH_2$—$CH(CH_3)$—O—CO—Q;

$R_{17}$, when n is 2, is $C_{2-12}$ alkylene; $C_{6-12}$ arylene; a group —$CH_2$—$CH(OH)$—$CH_2$—O—X—$CH_2$—CH(OH)—$CH_2$— wherein X is $C_{2-10}$ alkylene, $C_{6-15}$ arylene or $C_{6-12}$ cycloalkylene; or a group —$CH_2CH$—(OZ') $CH_2$—(OCH$_2$—CH(OZ')—$CH_2$)$_2$— wherein Z' is hydrogen, $C_{1-18}$ alkyl, allyl, benzyl, $C_{2-12}$ alkanoyl, or benzoyl; or a divalent radical of an aliphatic, cycloaliphatic, araliphatic, or aromatic dicarboxylic acid;

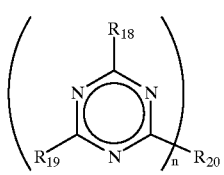 (IIIf)

where n is the number 1 or 2;

$R_{18}$ is a group of the formula

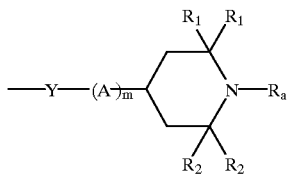

Y is —O—; —NR$_{21}$—; or —NR$_{21}$—CO—CO—NR$_{21}$—;

A is $C_{2-6}$ alkylene;

m is the number 0 or 1;

$R_{19}$ is selected from the group consisting of —R$_{18}$, —NHR$_{21}$, —R$_{22}$, —OR$_{23}$, —NHCH$_2$OR$_{23}$ and —N(CH$_2$OR$_{23}$)$_2$;

$R_{20}$, when n is 1, is a group selected from $R_{18}$ and $R_{19}$;

$R_{20}$, when n is 2, is the group —Y—Q$_1$—Y—;

wherein $Q_1$ is $C_{2-6}$ alkylene optionally interrupted by —N(R$_{24}$)—;

$R_{21}$ is hydrogen, $C_{1-12}$ alkyl, cyclohexyl, benzyl, or $C_{1-4}$ hydroxyalkyl, or a group of the formula

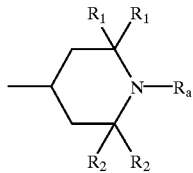

$R_{22}$ is $C_{1-12}$ alkyl, cyclohexyl, benzyl, or $C_{1-4}$ hydroxyalkyl;

$R_{23}$ is hydrogen, $C_{1-12}$ alkyl, or phenyl;

$R_{24}$ is hydrogen or the group —CH$_2$OR$_{23}$;

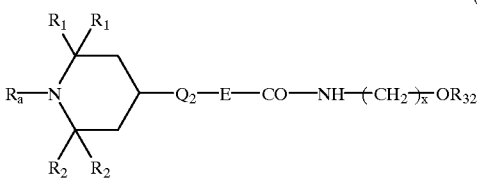
(IIIg)

wherein x is an integer from 1 to 6 inclusive;

$Q_2$ is —N(R$_{31}$)— or —O—;

E is $C_{1-3}$ alkylene; —CH$_2$—CH(R$_{34}$)—O— where R$_{34}$ is hydrogen, methyl, or phenyl; —(CH$_2$)$_3$—NH—; a single bond; or —CO—;

$R_{32}$ is hydrogen or $C_{1-18}$ alkyl;

$R_{31}$ is hydrogen; $C_{1-18}$ alkyl; $C_{5-7}$ cycloalkyl; $C_{7-12}$ aralkyl; cyanoethyl; $C_{6-10}$ aryl; —CH$_2$—CH(R$_{4a}$)—OH;

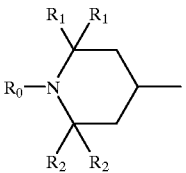

where $R_o$ is $R_a$;

or $R_{31}$ is

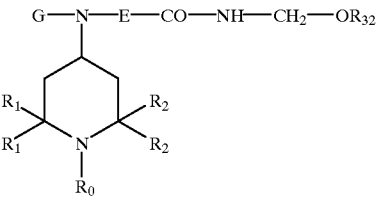

where G is $C_{2-6}$ alkylene or $C_{6-12}$ arylene;

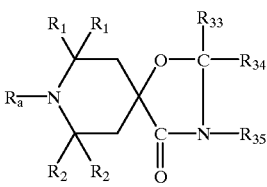
(IIIh)

wherein $R_{33}$ and $R_{34}$ 1) independently are hydrogen, $C_{1-30}$ alkyl, or benzyl; or 2) $R_{33}$ is hydrogen or $C_{1-4}$ alkyl and $R_{34}$ is phenyl, ($C_{1-4}$ alkyl)phenyl, chlorophenyl, 4-hydroxy-3,5-t-butylphenyl, or naphthyl; or 3) $R_{33}$ and $R_{34}$ together with the carbon atoms to which they are attached form a $C_{5-15}$ cycloalkylidene ring optionally substituted by one $C_{1-4}$ alkyl group or form a group of formula

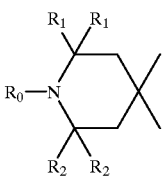

$R_{35}$ is hydrogen, $C_{1-20}$ alkyl, $C_{2-20}$ alkenyl, or —CH(R$_{36}$)—CH(R$_{37}$)—COOR$_{38}$ where $R_{36}$ is hydrogen, methyl, phenyl or —COOC$_{1-21}$ alkyl;

$R_{37}$ is hydrogen or methyl; and $R_{38}$ is 1) hydrogen; 2) a $C_{1-21}$ alkyl or $C_{2-22}$ alkenyl group optionally monosubstituted by phenyl or naphthyl and which may be interrupted by oxygen or by a $C_{1-4}$ alkylimine group; 3) phenyl; 4) ($C_{1-12}$ alkyl) phenyl; 5) $C_{5-12}$ cycloalkyl; or 6) a saturated aliphatic hydrocarbon residue having 2–20 carbon atoms optionally interrupted by oxygen or by a $C_{1-4}$ alkylimine group and which is substituted by 1 to 3 groups selected from the group consisting of ($C_{1-12}$ alkyl)COO— and

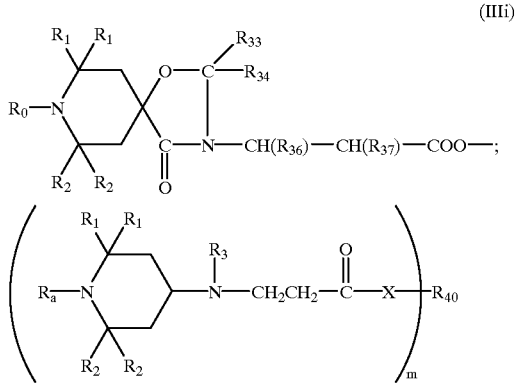

(IIIi)

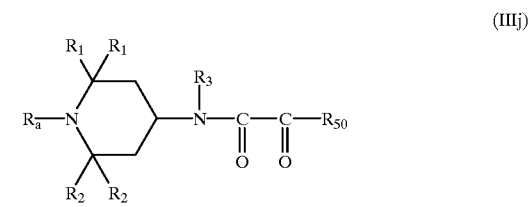

(IIIj)

wherein X is —O—, —NH— or —N(C$_{1-4}$ alkyl)—;

R$_{40}$ is a saturated or unsaturated aliphatic group unsubstituted or substituted by one or two substituents selected from the group consisting of —OH and C$_{1-4}$ alkoxy and which optionally is interrupted by an oxygen or sulphur atom; or an aromatic group, unsubstituted or substituted by one or two substituents selected from the group consisting of —OH, C$_{1-4}$ alkyl, and C$_{1-4}$ alkoxy;

m is an integer of from 1 to 4 inclusive;

where R$_{50}$ is an amide or ester forming group;

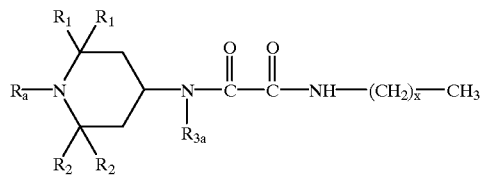

(IIIk)

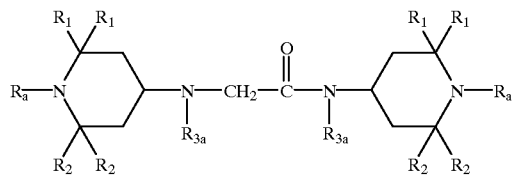

(IIIl)

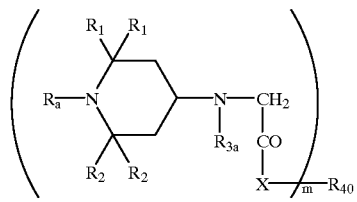

(IIIm)

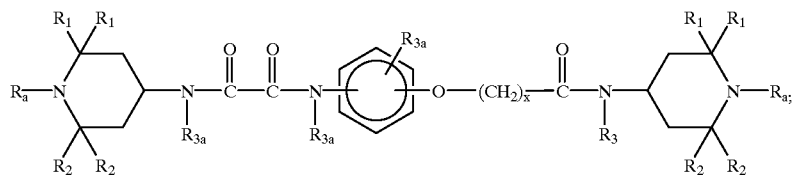

(IIIn)

wherein R$_1$, R$_2$, R$_a$, R$_{3a}$, R$_{40}$, X, x, and m are as defined above;

and the compound of formula IV is selected from the formulae IVa through IVn:

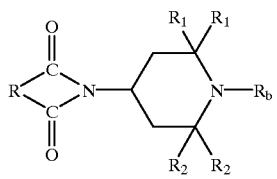 (IVa)
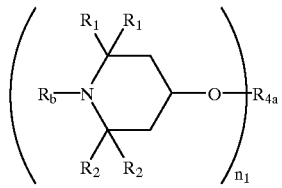 (IVb)
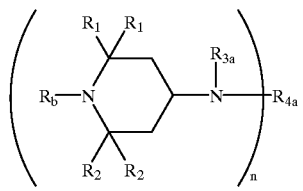 (IVc)
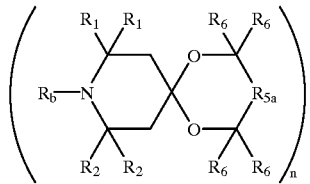 (IVd)
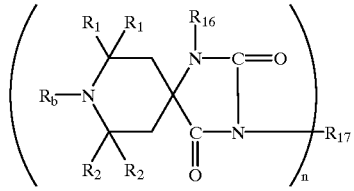 (IVe)
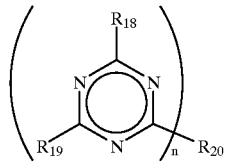 (IVf)
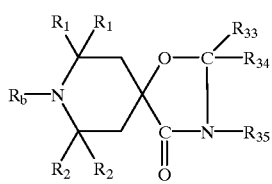 (IVg)
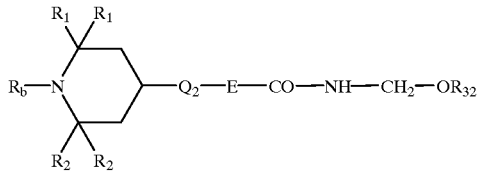 (IVh)

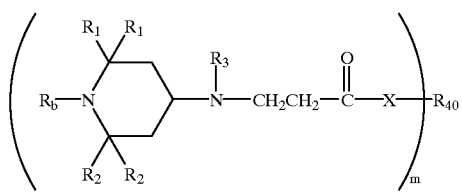
(IVi)
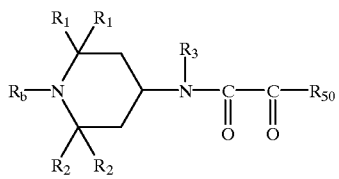
(IVj)
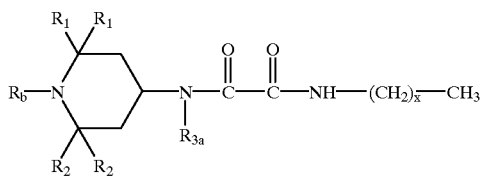
(IVk)
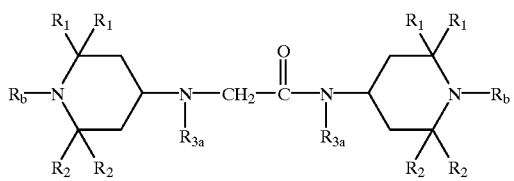
(IVl)
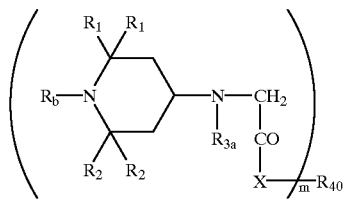
(IVm)
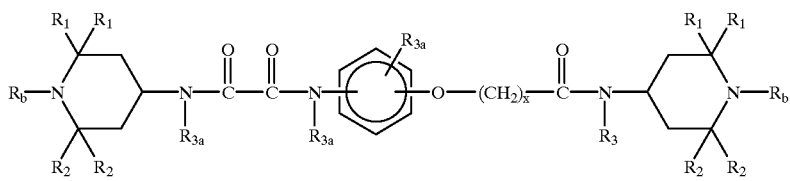
(IVn)
wherein $R_1$, $R_2$, $R_b$, R, $R_{5a}$, $R_{18}$, $R_{19}$, $R_{20}$, $R_{33}$, $R_{34}$, $R_{35}$, $R_{50}$, $Q_2$, n, and $n_1$ are as defined above.
5. A mixture of claim 4 wherein the compound of formula III is of the formula III', III", or III'"
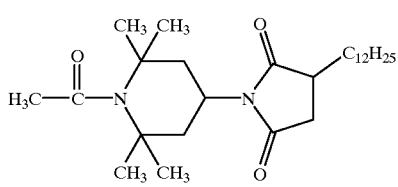
(III')
-continued
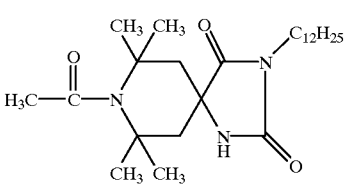
(III")

-continued (III''')

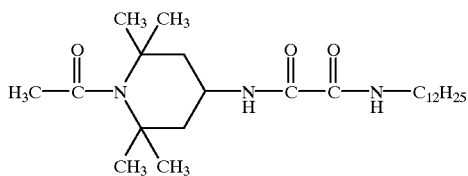

and a compound of formula IV is of the formula IV'

(IV')

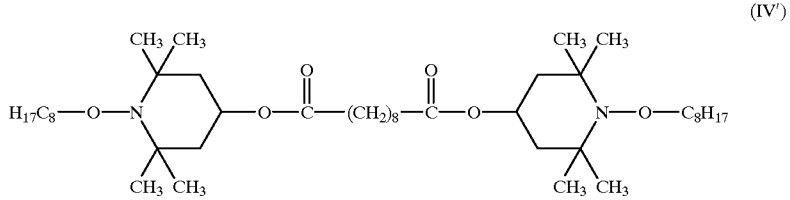

6. A polymeric composition comprising a polymeric material and a mixture of component a) and of component b) defined in claims 1, 4, or 5, or a mixture of component i) and of component ii) wherein component i) is a compound of formula V (V)

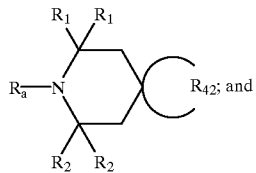

component ii) is a compound of formula VI (VI)

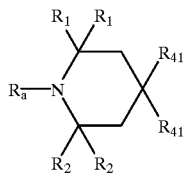

wherein
  each $R_1$, independently, is —$CH_3$ or —$CH_2(C_{1-4}alkyl)$, or both groups $R_1$ form a group —$(CH_2)_5$—;
  each $R_2$, independently, is —$CH_3$ or —$CH_2(C_{1-4}alkyl)$, or both groups $R_2$ from a group —$(CH_2)_5$—;
  $R_a$ is —CO—$R_5$;
  $R_5$ is $C_{2-8}$alkenyl, $C_{1-22}$alkyl, phenyl, —CO-phenyl, —$NR_7R_8$, —$CH_2$—$C_6H_5$, —CO—$OC_{1-12}$alkyl, or —COOH;
  $R_7$ is hydrogen, $C_{1-12}$alkyl, $C_{5-6}$cycloalkyl, phenyl, phenyl-$C_{1-4}$-alkyl, or $C_{1-12}$alkylphenyl;
  $R_8$ is $C_{1-12}$alkyl or hydrogen,
  each $R_{41}$, independently, is hydrogen, an amide forming group, an ester, an ester forming group, a urea, or a urethane forming group; and $R_{42}$ together with the C atom to which it is attached forms a spiro group.

7. A method for stabilizing a lacquer composition based on acrylic, alkyd, and/or polyester resins, optionally crosslinked with melamine/formaldehyde resins, epoxide resins or polyisocyanates, which comprises incorporating into the resin a mixture of component a) and of component b) defined in claims 1, 4, or 5 or a mixture of component i) and of component ii) wherein component i) is a compound of formula V (V)

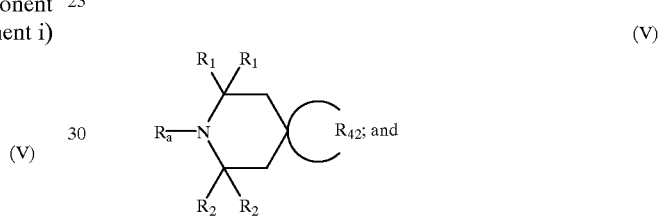

component ii) is a compound of formula VI (VI)

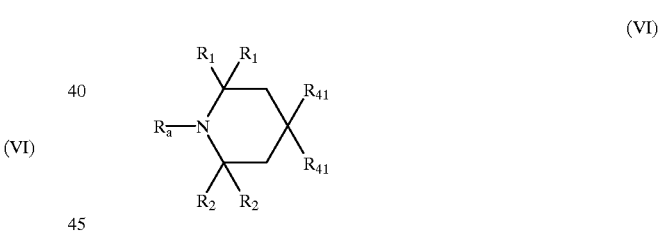

wherein
  each $R_1$, independently, is —$CH_3$ or —$CH_2(C_{1-4}alkyl)$, or both groups $R_1$ form a group —$(CH_2)_5$—;
  each $R_2$, independently, is —$CH_3$ or —$CH_2(C_{1-4}alkyl)$, or both groups $R_2$ from a group —$(CH_2)_5$—;
  $R_a$ is —CO—$R_5$,
  $R_5$ is $C_{2-8}$alkenyl, $C_{1-22}$alkyl, phenyl, —CO-phenyl, —$NR_7R_8$, —$CH_2$—$C_6H_5$, —CO—$OC_{1-12}$alkyl, or —COOH;
  $R_7$ is hydrogen, $C_{1-12}$alkyl, $C_{5-6}$cycloalkyl, phenyl, phenyl-$C_{1-4}$-alkyl, or $C_{1-12}$alkylphenyl;
  $R_8$ is $C_{1-12}$alkyl or hydrogen;
  each $R_{41}$, independently, is hydrogen, an amide forming group, an ester, an ester forming group, a urea, or a urethane forming group; and
  $R_{42}$ together with the C atom to which it is attached forms a spiro group optionally together with an acid catalyst or compound capable of releasing an acid catalyst.

8. A lacquer composition based on acrylic, alkyd and/or polyester resins, optionally crosslinked with melamine/ formaldehyde resins, epoxide resins or polyisocyanates, containing a mixture of component a) and of component b) defined in claims 1, 4, or 5, or a mixture of component i) and of component ii) wherein component i) is a compound of formula V

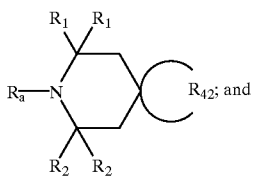

(V)

component ii) is a compound of formula VI

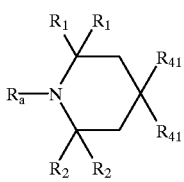

(VI)

wherein each $R_1$, independently, is —$CH_3$ or —$CH_2(C_{1-4}$alkyl), or both groups $R_1$ form a group —$(CH_2)_5$—;

each $R_2$, independently, is —$CH_3$ or —$CH_2(C_{1-4}$alkyl), or both groups $R_2$ from a group —$(CH_2)_5$—;

$R_a$ is —CO—$R_5$, $R_5$ is $C_{2-8}$alkenyl, $C_{1-22}$alkyl, phenyl, —CO-phenyl, —$NR_7R_8$, —$CH_2$—$C_6H_5$, —CO—$OC_{1-12}$alkyl, or —COOH;

$R_7$ is hydrogen, $C_{1-12}$alkyl, $C_{5-6}$cycloalkyl, phenyl, phenyl-$C_{1-4}$-alkyl, or $C_{1-12}$alkylphenyl;

$R_8$ is $C_{1-12}$alkyl or hydrogen;

each $R_{41}$, independently, is hydrogen, an amide forming group, an ester, an ester forming group, a urea, or a urethane forming group; and $R_{42}$ together with the C atom to which it is attached forms a spiro group optionally together with an acid catalyst or compound capable of releasing an acid catalyst.

9. A method of stabilizing an acid catalyzed polymeric lacquer against the effects of light while at the same time providing good hardening properties which comprises incorporating therein an effective amount of a mixture of claim 3.

10. A mixture of claim 3 wherein:

$R_3$ is hydrogen or $C_{1-4}$alkyl;

$R_4$ is an amine; and $R_5$ is —$C(R_3)$=$CH_2$.

11. A mixture of claim 1 wherein:

$R_3$ is H or $C_{1-4}$alkyl;

$R_4$ is an amine; and $R_5$ is —$C(R_3)$=$CH_2$.

12. A mixture of claim 1 wherein:

a) is a compound of formula 1a:

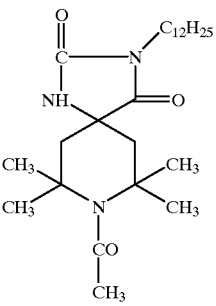

1a and
b) is a compound of formula 1b

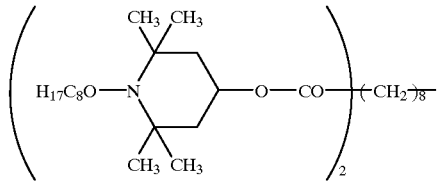

1b

13. A mixture of claim 1 wherein:

a) is a compound of formula 3a

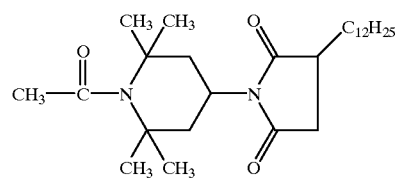

3a and
b) is a compound of formula 1b

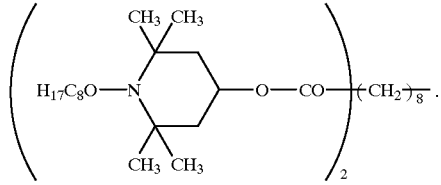

1b

14. A mixture of claim 4 wherein $A^1$ is a radical of an aliphatic carboxylic acid having 2–18 carbon atoms, of a cyloaliphatic carboxylic acid having 5–12 carbon atoms, or of an aromatic carboxylic acid having 7–15 carbon atoms; or $B^1$ is a radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms.

* * * * *